No. 652,106. Patented June 19, 1900.
R. HATHAWAY.
DISINTEGRATOR.
(Application filed Apr. 15, 1899.)
(No Model.)
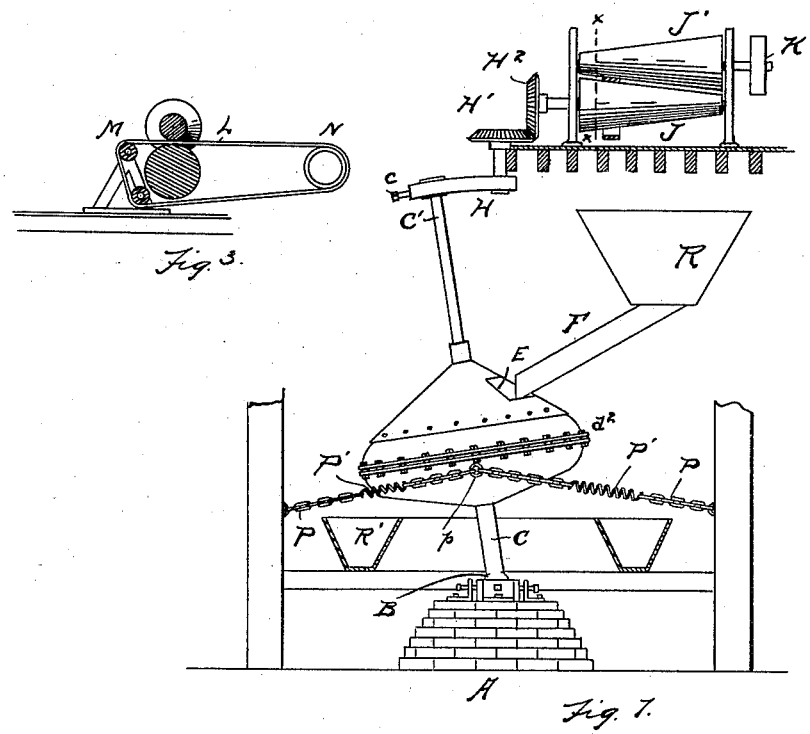
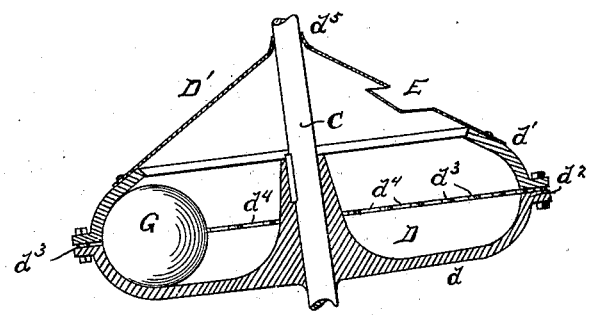
WITNESSES
Chas. E. Wiener
M. E. Kott
INVENTOR
Rollin Hathaway
By Parker & Burton
Attorneys.

UNITED STATES PATENT OFFICE.

ROLLIN HATHAWAY, OF DETROIT, MICHIGAN.

DISINTEGRATOR.

SPECIFICATION forming part of Letters Patent No. 652,106, dated June 19, 1900.

Application filed April 15, 1899. Serial No. 713,082. (No model.)

*To all whom it may concern:*

Be it known that I, ROLLIN HATHAWAY, a citizen of the United States, residing at Detroit, county of Wayne, State of Michigan, have invented a certain new and useful Improvement in Disintegrators; and I declare the following to be a full, clear, and exact description of the invention, such as will enable others skilled in the art to which it pertains to make and use the same, reference being had to the accompanying drawings, which form a part of this specification.

My invention relates to pulverizing-machines; and it consists in the arrangements and combinations hereinafter specified and claimed.

In the drawings, Figure 1 is an elevation of the apparatus. Fig. 2 is a sectional view of the pulverizer, showing its internal arrangements. Fig. 3 is a cross-section through the driving-cone on the line $x\,x$ of a portion of Fig. 1 and showing the belt arrangements.

In the drawings, A represents the foundation upon which the crusher is mounted.

B is an adjustable ball-joint on the end of the shaft C.

D is a vat made of two sections $d$ and $d'$, bolted together by flanges at $d^2$. Washers $d^3$ are placed between these flanges and surrounding the bolts, so as to leave spaces $d^4$ between the washers and between the flanges, which spaces constitute openings leading from the interior of this vat to the outer air.

D' is a preferably conical casing or covering which is attached to the upper section $d'$ of this vat and is fixed to the shaft C at $d^5$. In this conical casing there is cut an opening E, in which a spout F is loosely located. Inside of the casing, the cross-section of which is rounded at its periphery, there is loosely placed a heavy metal ball G, the rounded periphery of the casing substantially conforming to nearly one-half of the surface of this sphere. The upper end of the shaft C at C' is carried in a bearing upon a crank H. This crank is driven, preferably, by a bevel-wheel H', firmly attached to the crank-shaft. Another bevel-wheel $H^2$ meshes into it, upon the shaft of which is a conical pulley J. In connection with this shaft is located another conical pulley J', upon the shaft of which is a band-wheel K for driving it. As shown in Fig. 3, these pulleys J J' are closely located with reference to one another and between them runs a leather belt L. This belt runs comparatively loosely over two pulleys M N, which are simple carrying-pulleys. The belt is not attached to anything and is not a driving-belt in the ordinary sense. It is compressed between the two conical pulleys J J', so that one driving-pulley will drive the other by means of the friction due to the compression of the belt.

It is obvious that by shifting the belt from end to end of the two pulleys J J' a large variation in the speed of the shaft $H^2$ can be obtained with the uniform speed of the pulley J', and consequently all driving mechanism connected with the pulley J and its shaft $H^2$ would be correspondingly varied in speed.

The crank H is, as shown, preferably slightly curved on a circle, the radius of which is the bearing B, or, in other words, the length of the shaft C. A set-screw $c$ controls a sliding bearing in the crank, which bearing carries the upper end of the shaft C, and consequently the throw of the crank can thus be increased or diminished at will.

The vat D does not rotate, although it is hung somewhat loosely and has a freedom of motion so far as the ball-joint B is concerned. It is prevented from rotation by the stay-chains P P, which are attached to it at $p$ and also attached at the opposite ends to any convenient portion of the building. These stays should be substantially in a vertical plane perpendicular to another vertical plane drawn through the crank-shaft H, the universal joint B, and the point of attachment of the chains $p$. I have found that by so placing them the shocks thrown thereon are very much less than they are if located out of the vertical plane drawn through the three points referred to. These stay-chains preferably carry strong spiral springs P' P', these chains taking up any jar and preventing undue sudden strains of any character.

The mode of operation of this device is as follows: Any material to be pulverized, as crushed rock of any character, is placed in the vat R and fed through the spout F into the opening E in the proper quantities. A gyrating motion is communicated by means of the pulley K and the conical pulleys J J' to the vat D, and by means of the belt this motion is at first comparatively slow. It can be increased by shifting the belt horizontally along the pulleys J J' to any desired speed. On gyrating the vat D in the manner above described the heavy ball G, which continually tends to remain in the lowest position in the vat D, will roll around the periphery of the vat in the channel formed by its curved sides with a twisting or grinding motion, and this I have found by means of a heavy ball will rapidly pulverize any material fed into it that is capable of pulverization.

Some means of starting the gyrations slowly and then increasing them to a comparatively-rapid motion is actually necessary in order to do effective work. If the gyrations are started rapidly, the ball will not have time to accommodate itself to the motion and will remain in one place, whereas if the gyrations are initiated slowly the ball will begin to roll, and then as the gyrations increase in rapidity it will roll faster and faster at an almost incredible rate of speed. I have never yet found I could drive a mechanism of this character faster than the ball would roll provided it was started slowly, as stated. As the ball rolls rapidly around the periphery of the vat D it pulverizes the material contained in it and at the same time creates an air-blast ahead of it, which forces the light pulverized material out through the openings $d^4$ $d^4$, and this falls into a circumferential vat R', from whence it may be gathered by any appropriate means. It is also obvious that the stay-chains P P are necessary, or at least some equivalent means are necessary, for restraining the rotation of the vat D. Otherwise it would tend to rotate in consequence of the ball remaining in the lowest side, and this would prevent the rotation of the ball with reference to the vat, as both ball and vat would tend to rotate in unison. The stay-chains P P permit of a variation in the radius of the motion of the upper part of the shaft C and will have a resilient action tending to relieve the bearing of said shaft in the crank H of the strain due to the weight of the machine.

The covering D' forms a brace for the shaft C. The method of securing said covering to the vat D by bolts at their peripheries with interposed washers makes a very strong and rigid structure and secures peripheral opening of the desired size by a device that is convenient to make and set up.

What I claim is—

1. In a pulverizing-machine of the kind described, in combination with a vat adapted to gyrate, means for giving the same a gyrating motion upon a lower universal joint, stays secured at a point upon the periphery of said vat and extending substantially at right angles to a vertical plane passing through said point of attachment the crank and crankshaft for driving the vat and the universal joint below the vat, whereby said vat is prevented from rotating, substantially as described.

2. In a pulverizing-machine of the kind described the combination of a circular vat D, fixed upon a shaft C, extending through its center at right angles to its plane, a crank H, and means for driving the same to which the upper end of said shaft is attached whereby said vat is made to gyrate, a circular cover attached to the vat in such manner as to form discharge-slits between the vat and covering, said covering being extended and attached to the shaft C, a ball adapted to travel in the vat, means for preventing the vat from rotating upon its axis and means for feeding the material to be pulverized into said vat, into said cover and the pulverized material delivered through the openings between the vat and the covering, substantially as described.

3. The combination of a vat fixed on an axis adapted to gyrate, a ball located in said vat and permitted to rotate freely therein, means for compelling the vat to gyrate, means for preventing its circular rotation, and a superimposed annular ring having a concavity approximately fitting the curvature of the ball, said ring being secured to the vat in such manner as to afford narrow slit-like passages between the vat and the ring, substantially as described.

4. The combination of a vat fixed on an axis adapted to gyrate, a ball located in said vat and permitted to rotate freely therein, means for compelling the vat to gyrate, means for preventing its circular rotation, a superimposed annular ring having a concavity approximately fitting the curvature of the ball, said ring being secured to the vat in such manner as to afford narrow slit-like passages between the vat and the ring, and a cover extending from the ring to the axis whereby all the discharge of the material is forced through the slits, substantially as specified.

In testimony whereof I sign this specification in the presence of two witnesses.

ROLLIN HATHAWAY.

Witnesses:
C. C. JENNINGS,
MARION A. REEVE.